US 10,848,361 B2

(12) United States Patent
Gaal et al.

(10) Patent No.: US 10,848,361 B2
(45) Date of Patent: Nov. 24, 2020

(54) CARRIER INDEPENDENT SIGNAL TRANSMISSION AND RECEPTION

(71) Applicant: QUALCOMM Incorporated, San Diego, CA (US)

(72) Inventors: Peter Gaal, San Diego, CA (US); Muhammad Nazmul Islam, Littleton, MA (US); Heechoon Lee, San Diego, CA (US); Navid Abedini, Somerset, NJ (US); Juergen Cezanne, Ocean Township, NJ (US); Alexei Yurievitch Gorokhov, San Diego, CA (US); Wanshi Chen, San Diego, CA (US); Xiao Feng Wang, San Diego, CA (US); Hung Dinh Ly, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 43 days.

(21) Appl. No.: 16/210,970

(22) Filed: Dec. 5, 2018

(65) Prior Publication Data
US 2019/0182094 A1 Jun. 13, 2019

Related U.S. Application Data

(60) Provisional application No. 62/622,047, filed on Jan. 25, 2018, provisional application No. 62/617,117, (Continued)

(51) Int. Cl.
H04L 12/26 (2006.01)
H04L 27/26 (2006.01)
(Continued)

(52) U.S. Cl.
CPC ........ *H04L 27/2666* (2013.01); *H04L 5/0053* (2013.01); *H04L 27/2607* (2013.01);
(Continued)

(58) Field of Classification Search
None
See application file for complete search history.

(56) References Cited

U.S. PATENT DOCUMENTS

2014/0018029 A1* 1/2014 Chang ..................... H04B 1/10
455/307

OTHER PUBLICATIONS

Intel: "Correcting NR OFDM Symbol Generation," 3GPP Draft; R1-1721601 Correcting NR OFDM Symbol Generation V2, 3rd Generation Partnership Project (3GPP), Mobile Competence Centre; 650, Route Des Lucioles; F-06921 Sophia-Antipolis Cedex; France, vol. RAN WG1, No. Reno, NV, USA; Nov. 26, 2017-Dec. 1, 2017, Dec. 1, 2017, XP051370639, 17 pages, Retrieved from the Internet: URL: http://www.3gpp.org/ftp/tsg%5Fran/WG1%5FRL1/TSGR1%5F91/Docs/ [retrieved on Dec. 1, 2017].
(Continued)

*Primary Examiner* — Zewdu A Beyen
(74) *Attorney, Agent, or Firm* — Patterson & Sheridan, LLP

(57) ABSTRACT

Certain aspects of the present disclosure provide techniques for carrier independent signal transmission and reception. Certain aspects provide a method for wireless communication. The method includes applying, at a device, a phase correction to a first signal to compensate for a difference between a first zero tone location comprising a first frequency and a second zero tone location comprising a second frequency. The method further includes one of: transmitting the first signal after applying the phase correction; or receiving the first signal prior to applying the phase correction.

28 Claims, 18 Drawing Sheets

Related U.S. Application Data filed on Jan. 12, 2018, provisional application No. 62/596,682, filed on Dec. 8, 2017.

(51) Int. Cl.
*H04L 5/00* (2006.01)
*H04W 72/04* (2009.01)

(52) U.S. Cl.
CPC ...... *H04L 27/2627* (2013.01); *H04L 27/2657* (2013.01); *H04W 72/0453* (2013.01); *H04L 5/001* (2013.01); *H04L 27/2672* (2013.01)

(56) References Cited

OTHER PUBLICATIONS

Intel: "NR OFDM Symbol Generation Option Analysis," 3GPP Draft; Attachment of R1-1800296 OFDM Symbol Generation V6, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018, XP051384520, 22 pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018].

International Search Report and Written Opinion—PCT/US2018/064285—ISA/EPO—dated Mar. 8, 2019.

Panasonic: "Discussion on PRB Grid and PRB Indexing," 3GPP Draft; R1-1710943, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 26, 2017, XP051300144, 5 Pages, Retrieved from the Internet: URL: http://www.3gpp.org/ftp/Meetings_3GPP_SYNC/RAN1/Docs/ [retrieved on Jun. 26, 2017].

Qualcomm Incorporated: "Remaining Details on Synchronization Signal Design," 3GPP Draft; R1-1800846, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018, XP051385118, 8 Pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018].

\* cited by examiner

Without any difference in carrier freq.

$\Delta t \quad t = (N_{cp} + N_c) T_c$ $r_0\{(N_{cp} + N_c) T_c\} = \text{Re}\left[\{a_1 e^{j2\pi\Delta f \cdot N_C T_C} + a_2 e^{j2\pi \cdot 2\Delta f \cdot N_C T_C} + a_3 e^{j2\pi\Delta f \cdot N_C T_C}\}\right]$ $\Delta t \quad t = 2(N_{CP} + N_C) T_C$ $r_1\{2(N_{CP} + N_C) T_C\}$
$= \text{Re}\left[\{a_1 e^{j2\pi\Delta f \cdot N_C T_C} + a_2 e^{j2\pi \cdot 2\Delta f \cdot N_C T_C} + a_3 e^{j2\pi\Delta f \cdot N_C T_C}\}\right]$ $r_0\{(N_{CP} + N_C) T_C\}$ and $r_1\{2(N_{CP} + N_C) T_C\}$ are identical

FIG. 11

With difference in carrier freq.

$r_0\{(N_{CP} + N_C) T_C\} = \text{Re}\left[\{a_1 e^{j2\pi\Delta f \cdot N_C T_C} + \ldots\} \cdot e^{j2\pi(f_c - f_{RX})(N_{CP}+N_C)T_C}\right]$ $r_1\{2(N_{CP} + N_C) T_C\}$
$= \text{Re}\left[\{a_1 e^{j2\pi\Delta f N_C T_C} + \ldots\} \, e^{j2\pi(f_c - f_{RX}) \cdot 2(N_{CP}+N_C)T_C}\right]$ Now, $e^{j2\pi(f_c - f_{RX}) N_{CP} T_C} \neq e^{j2\pi(f_c - f_{RX}) \cdot 2N_{CP}T_C}$

FIG. 12

Generation of time domain pass band
signal from OFDM data tones:

$$x(t) = \text{Re}\left\{\sum_{l}\sum_{k=-\frac{N}{2}}^{N/2-1} a_{k,l}\, e^{j\,2\pi k\,\Delta f(t-lT_{sym}-T_{CP})} \times w(t-lT_{sym})\cdot e^{j2\pi f_c t}\right\}$$

| | | | |
|---|---|---|---|
| $l \to$ | symbol index | $T_{CP} \to$ | CP duration |
| $k \to$ | tones index | $f_c \to$ | Carrier freq |
| $N \to$ | Total tones | | |
| $\Delta f \to$ | Tone spacing | | |
| $T_{sym} \to$ | Symbol duration | | |

$$w(t) = \begin{cases} 1 & 0 \le t \le T_{sym} \\ 0 & \text{otherwise} \end{cases}$$

Let us apply a phase correction $$X_2(t) = \text{Re}\left\{\sum_{l}\sum_{k=-\frac{N}{2}}^{N/2-1} a_{k,l}\, \boxed{e^{-j2\pi k_c\,\Delta f(l+1)T_{CP}}} \cdot e^{j2\pi k\Delta f(t-lT_{sym}-T_C)} \times w(t-lT_{sym})\cdot e^{j2\pi f_c t}\right\}$$

Here, $k_c\,\Delta f = f_c$.

FIG. 13

Now, $e^{-j2\pi k_c \Delta f(l+1)T_{CP}} = e^{-j2\pi k_c \Delta f(lT_{sym}+T_{CP})}$ So, $x_2(t) = \text{Re}\left\{ \sum_l \sum_{k=-\frac{N}{2}}^{N/2-1} a_{k,l} e^{j2\pi f_c(t-(l+1)T_{sym}-T_{CP})} \cdot e^{j2\pi k \Delta f(t - lT_{sym} - T_C)} w(t - lT_{sym}) \right\}$ $= \text{Re}\left\{ \sum_l \sum_{k=-\frac{N}{2}}^{N/2-1} a_{k,l} \, e^{j2\pi (k\cdot \Delta f + k_c \cdot \Delta f)(t - lT_{sym} - T_{CP})} \right\}$

FIG. 14

Received signal:

$y(t) = \text{Re}\left\{ x_2(t) \, e^{-j2\pi f_{RX} t} \right\}$ $= \text{Re}\left\{ \sum_l \sum_{k=-\frac{N}{2}}^{N/2-1} a_{k,l} \, e^{-j2\pi k_c \Delta f(l+1)T_{CP}} \, e^{j2\pi (f_c - f_{RX})t} \cdot e^{j2\pi k\Delta f(t - lT_{sym}-T_{CP})} \cdot w(t - lT_{sym}) \right\}$ $= \sum_l \sum_{k=-\frac{N}{2}}^{N/2-1} a_{k,l} \, e^{-j2\pi k_{RX} \Delta f(l+1)T_{CP}} \, e^{j2\pi (k+k_c - k_{RX})\Delta f(t-lT_{sym}-T_{CP})} \cdot w(t - lT_{sym})$ $a_{k,l}$ shows up in FFT bin # $k + k_c - k_{RX}$ after it is phase compensated by $e^{j2\pi k_{RX} \frac{T_{CP}}{T_{sym}} (l+1)}$

FIG. 15

Transmitter:
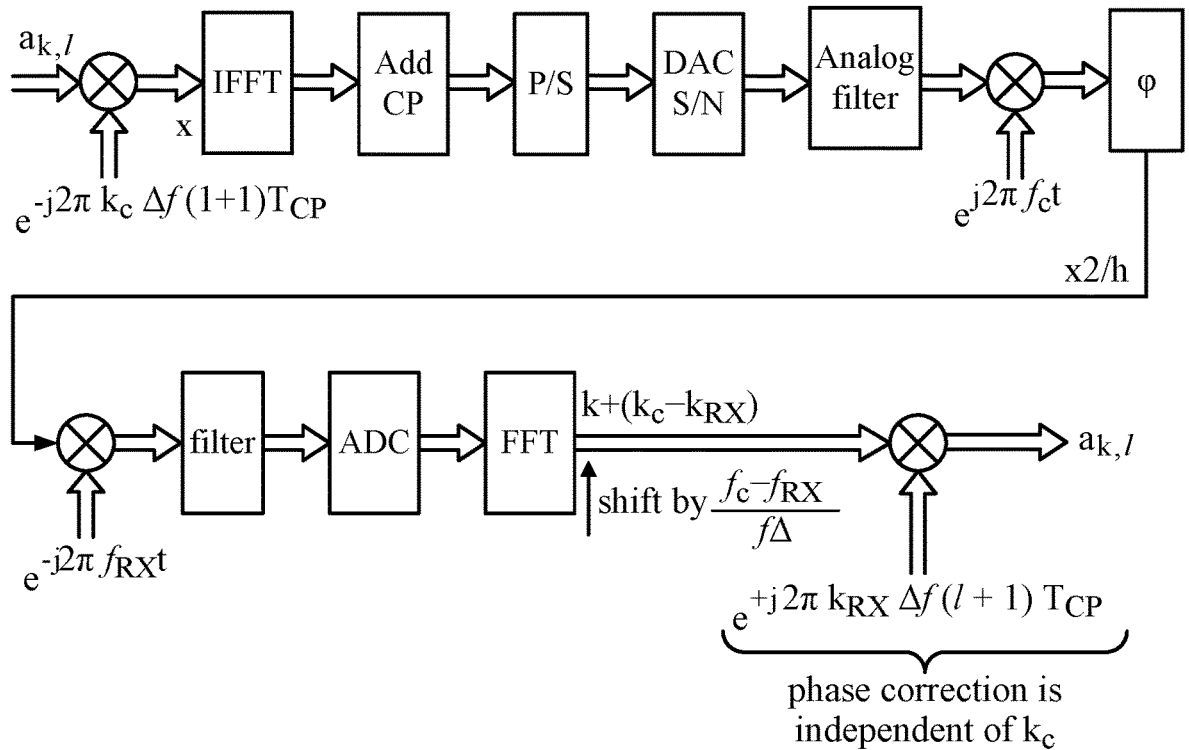
General:
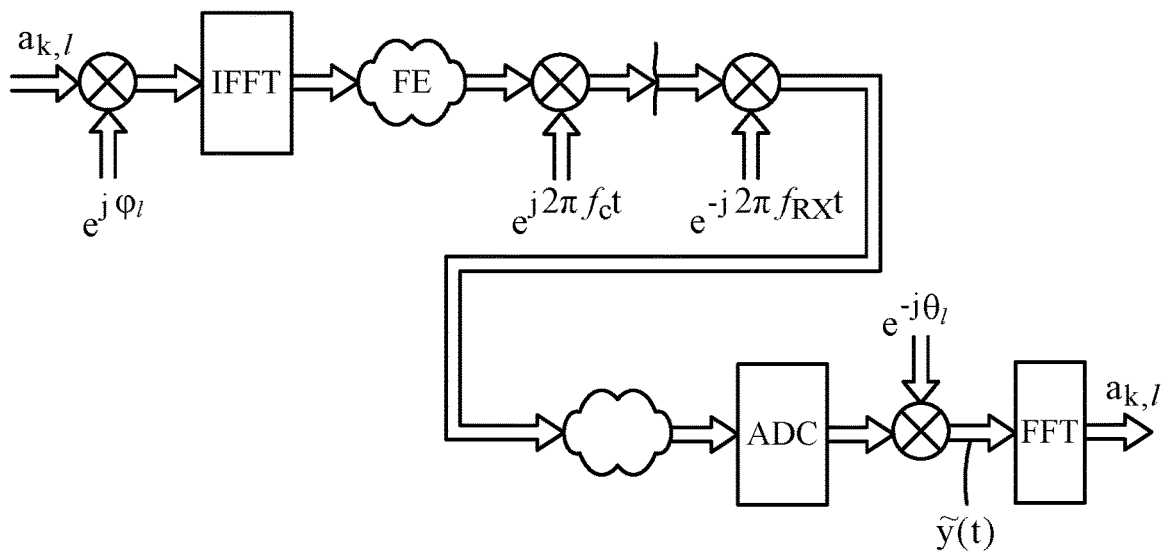
$$\tilde{y}(t) = \sum_l \sum_k a_{k,l} \cdot e^{j\varphi_l} \cdot e^{j 2\pi k \Delta f (t - lT_{sym} - T_{CP})} \cdot w(t - lT_{sym})$$
$$\cdot e^{j 2\pi (f_c - f_{RX})t} \cdot e^{-j\theta_l}$$
$$= \sum_l \sum_k a_{k,l} \, e^{j(\varphi_l - \theta_l + 2\pi (f_c - f_{RX}) \cdot (lT_{sym} + T_{CP}))} \cdot e^{j 2\pi (k\Delta f + f_c - f_{RX})(t-\ldots)}$$
$$\cdot w(t - lT_{sym})$$
FIG. 16

$$\Rightarrow \theta_l = \varphi_l + 2\pi (f_c - f_{RX})(lT_{sym} + T_{CP})$$

$$\varphi_l + 2\pi f_c(lT_{sym} + T_{CP}) = \theta_l + 2\pi f_{RX}(lT_{sym} + T_{CP}) \quad (1)$$

If $f_c - f_{RX} = n \cdot \Delta f$ then (1) can be rewritten as $$\varphi_l + 2\pi f_c \cdot T_{CP} \cdot (l+1) = \theta_l + 2\pi f_{RX} T_{CP}(l+1) \quad (2)$$

Choice 1:      Choose $\varphi_l$ and these $$\varphi_l + 2\pi f_c T_{CP}(l+1) = \text{constant with respect to } l = C$$

$$\varphi_l = C - 2\pi f_c T_{CP} - 2\pi f_c T_{CP} \cdot l$$

$$\theta_l = C - 2\pi f_{RX} T_{CP} - 2\pi f_{RX} T_{CP} \cdot l$$

Choice 2:      Choose $\varphi_l$ such that $$\varphi_l + 2\pi f_c \cdot T_{CP}(l+1) = C_0 + C_1 \cdot l$$

$$\varphi_l = (C_0 - 2\pi f_c T_{CP}) - (2\pi f_c T_{CP} - C_1) l$$

$$\theta_l = (C_0 - 2\pi f_{RX} T_{CP}) - (2\pi f_{RX} T_{CP} - C_1) l$$

FIG. 17

$$C_1 = 2\pi f_{RX} \cdot T_{CP}$$

$$\boxed{\begin{array}{l}\varphi_l = (C_0 - 2\pi f_c T_{CP}) - 2\pi(f_c - f_{ref})T_{CP} \cdot l \\ \theta_l = (C_0 - 2\pi f_{RX} T_{CP}) - 2\pi(f_{RX} - f_{ref})T_{CP} \cdot l\end{array}}$$

Choice 3:

$$\varphi_l + 2\pi f_c T_{CP}(l+1) = C(l)$$

$$\theta_l + 2\pi f_{RX} T_{CP}(l+1) = C(l)$$

arbitrary but fixed sequence defined in spec

How large is
$$2\pi f_c \cdot T_{CP} = 2\pi \cdot 28\text{ Ghz} \cdot 144 \underbrace{\frac{1}{122.88\text{ Mhz}}}_{32812.5}$$

$$\hat{=} \pi$$

$$2\pi f_{RX}(l+\varepsilon) \cdot T_{CP} = 2\pi f_{RX} T_{CP} + 2\pi f_{RX}\varepsilon \cdot T_{CP}$$

$$\varepsilon = 5 \cdot 10^{-6} \qquad 30\text{ Ghz 5ppm} = \boxed{150\text{ Ghz}}$$

$\theta_l$ are computed on intended $f_{RX}$

So then $\varphi_l - \theta_l$ is correct

```
┌─────────────────────────────────────────────────────────────┐ ─ 1902
│ ASSUME A FIRST SIGNAL CORRESPONDS TO A FIRST ZERO TONE     │
│ LOCATION COMPRISING A FIRST FREQUENCY, WHEREIN THE FIRST   │
│ SIGNAL ACTUALLY CORRESPONDS TO A SECOND ZERO TONE          │
│ LOCATION COMPRISING A SECOND FREQUENCY THAT IS DIFFERENT   │
│ THAN THE FIRST FREQUENCY                                   │
└─────────────────────────────────────────────────────────────┘
```

```
┌─────────────────────────────────────────────────────────────┐ ─ 1904
│ APPLY A PHASE CORRECTION TO THE FIRST SIGNAL TO COMPENSATE │
│ FOR A DIFFERENCE BETWEEN THE FIRST ZERO TONE LOCATION AND  │
│ THE SECOND ZERO TONE LOCATION A SECOND ZERO TONE LOCATION  │
│ COMPRISING A SECOND FREQUENCY DIFFERENT FROM THE FIRST     │
│ ZERO TONE LOCATION TO DETERMINE A WAVEFORM TYPE OF THE     │
│ FIRST SIGNAL                                               │
└─────────────────────────────────────────────────────────────┘
```

FIG. 19

CARRIER INDEPENDENT SIGNAL TRANSMISSION AND RECEPTION

CROSS-REFERENCE TO RELATED APPLICATIONS

This application claims the benefit of U.S. Provisional Patent No. 62/622,047, filed Jan. 25, 2018; U.S. Provisional Patent No. 62/617,117, filed Jan. 12, 2018; and U.S. Provisional Patent No. 62/596,682, filed Dec. 8, 2017. The content of each of the provisional applications is hereby incorporated by reference in its entirety.

INTRODUCTION

Aspects of the present disclosure relate to wireless communications and to techniques for carrier independent signal transmission and reception.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes assuming, at a device, a first signal corresponds to a first zero tone location comprising a first frequency, wherein the first signal actually corresponds to a second zero tone location comprising a second frequency that is different than the first frequency; and applying, at the device, a phase correction to the first signal to compensate for a difference between the first zero tone location and the second zero tone location.

Certain aspects provide a method for wireless communication. The method includes applying, at a device, a phase correction to a first signal to compensate for a difference between a first zero tone location comprising a first frequency and a second zero tone location comprising a second frequency. The method further includes one of: transmitting the first signal after applying the phase correction; or receiving the first signal prior to applying the phase correction.

Certain aspects provide a device for wireless communication including a memory and a processor coupled to the memory. The processor is configured to apply a phase correction to a first signal to compensate for a difference between a first zero tone location comprising a first frequency and a second zero tone location comprising a second frequency. The processor is further configured to one of: transmit the first signal after applying the phase correction; or receive the first signal prior to applying the phase correction.

Certain aspects provide a device for wireless communication. The device includes means for applying a phase correction to a first signal to compensate for a difference between a first zero tone location comprising a first frequency and a second zero tone location comprising a second frequency. The device further includes one of: means for transmitting the first signal after applying the phase correction; or means for receiving the first signal prior to applying the phase correction.

Certain aspects provide a non-transitory computer-readable storage medium comprising instructions that when executed by a device, cause the device to perform a method for wireless communication. The method includes applying, at a device, a phase correction to a first signal to compensate for a difference between a first zero tone location comprising a first frequency and a second zero tone location comprising a second frequency. The method further includes one of: transmitting the first signal after applying the phase correction; or receiving the first signal prior to applying the phase correction.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 11-18 illustrate example equations and systems for performing the techniques described herein.

FIG. 19 illustrates example operations that may be performed by a wireless device for processing signals in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
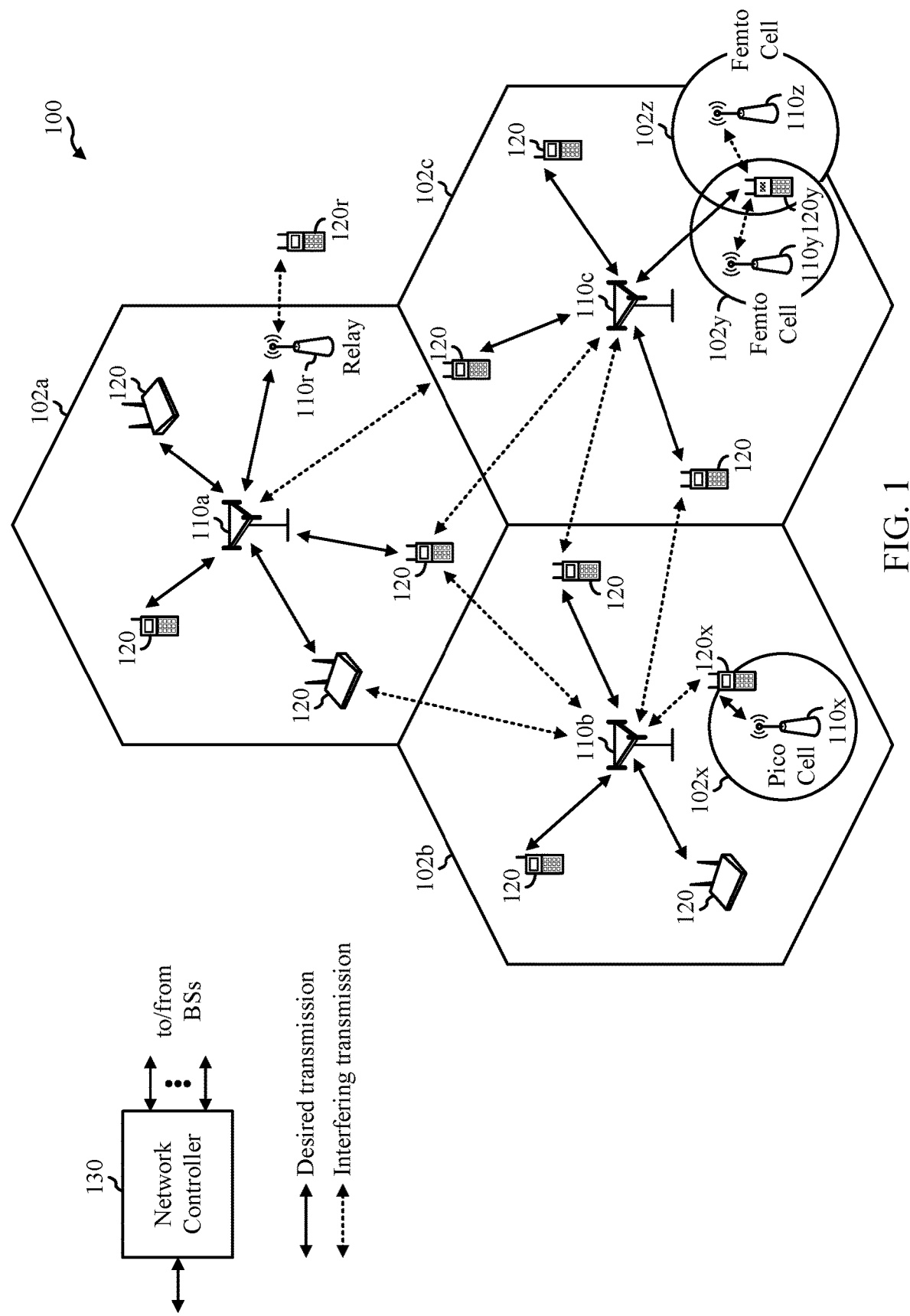
FIG. 1 is a block diagram conceptually illustrating an example telecommunications system, in accordance with certain aspects of the present disclosure.

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe. In LTE, the basic transmission time interval (TTI) or packet duration is 1 subframe. In NR, a subframe may still be 1 ms, but the basic TTI may be referred to as a slot. A subframe may contain a variable number of slots (e.g., 1, 2, 4, 8, 16, . . . slots) depending on the tone-spacing (e.g., 15, 30, 60, 120, 240 . . . kHz).

Aspects of the present disclosure relate to carrier independent signal transmission and reception.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network may be a new radio (NR) or 5G network. In certain aspects, a UE 120 may perform techniques for carrier independent signal reception, according to aspects discussed herein. For example, a UE 120 may perform post compensation of a received signal according to techniques discussed herein. Further, in certain aspects, a BS 110 may perform techniques for carrier independent signal transmission, according to aspects discussed herein. For example, a BS 110 may perform pre compensation of a signal prior to transmission according to techniques discussed herein.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals (SS), but in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
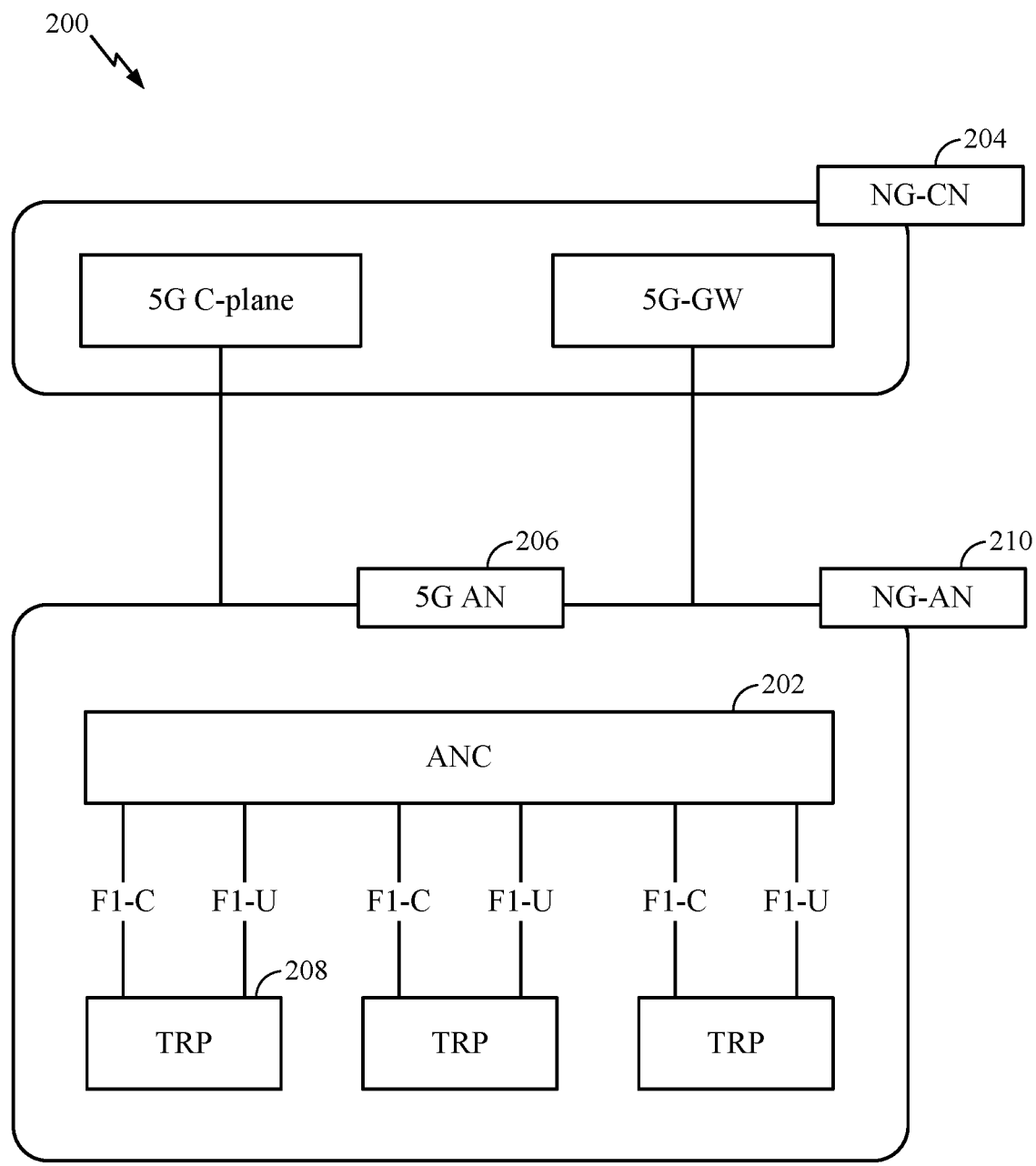
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The next generation AN (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
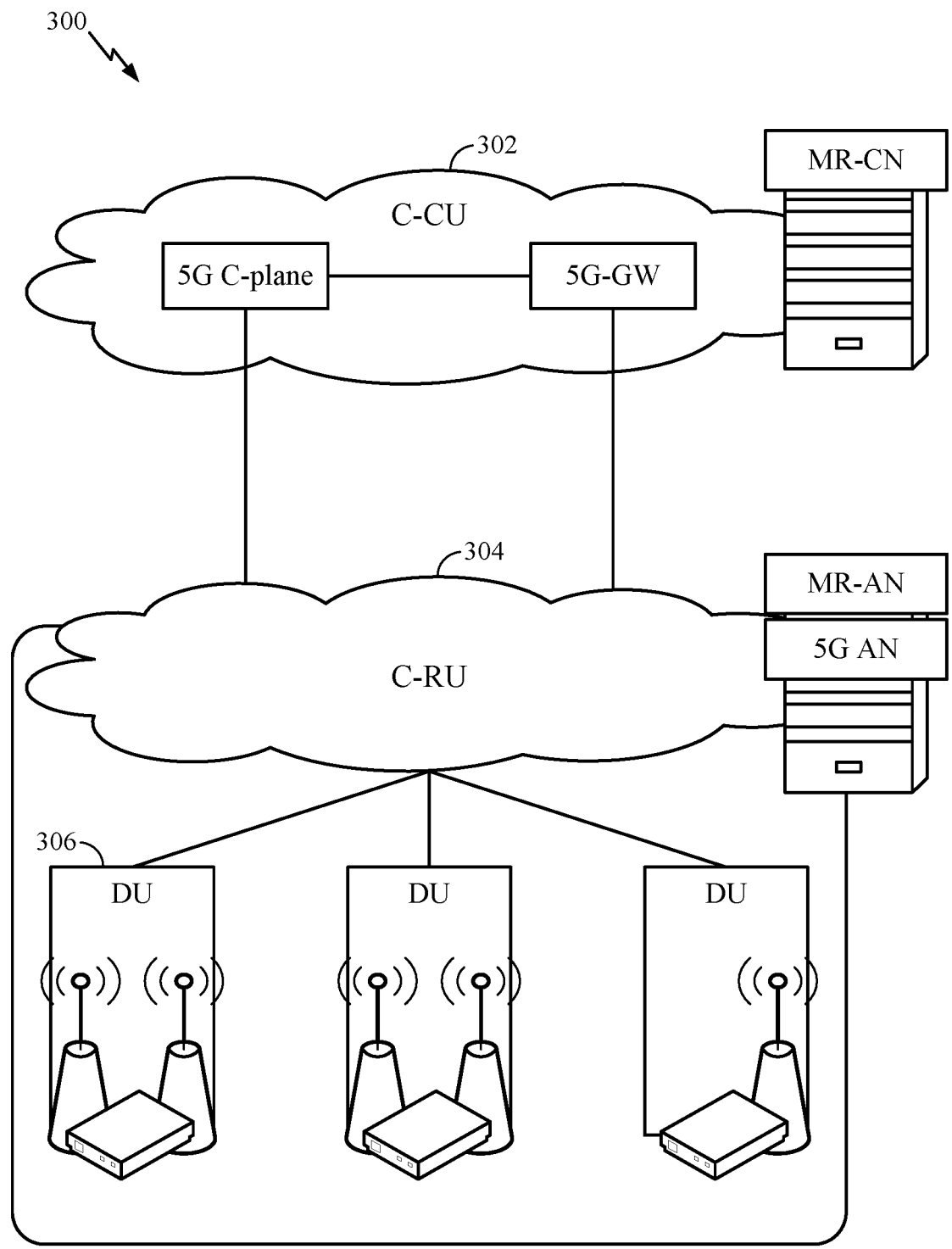
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
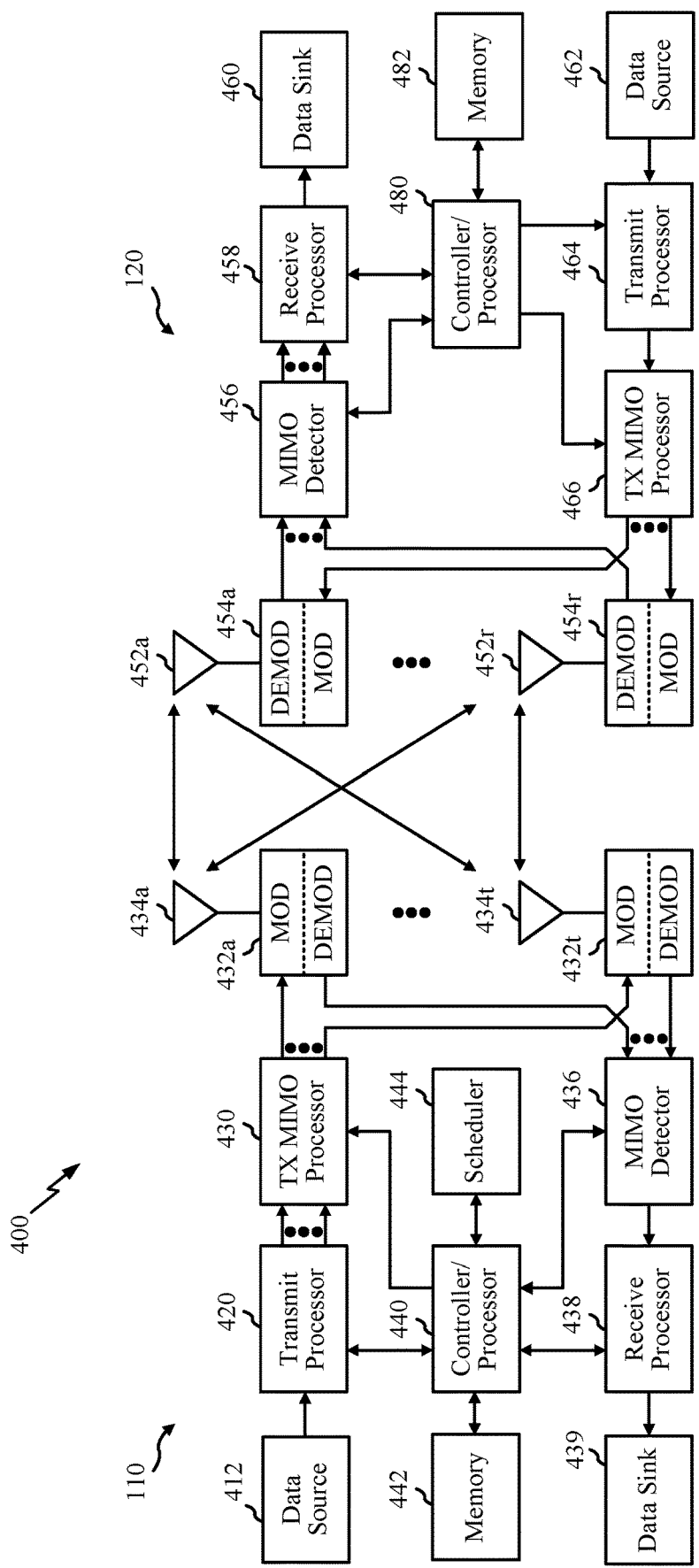
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform operations described herein and complementary operations. In certain aspects, one of modulator 432 or TX processor 420 applies a phase correction to a signal according to the techniques discussed herein. In certain aspects, one of demodulator 454 or RX processor 458 applies a phase correction to a signal according to the techniques discussed herein.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct processes and/or other complementary processes for the techniques described herein. The memories 442 and 482 may store data and program codes for the BS 110 and the UE 120, respectively. A scheduler 444 may schedule UEs for data transmission on the downlink and/or uplink.

Figure 5:
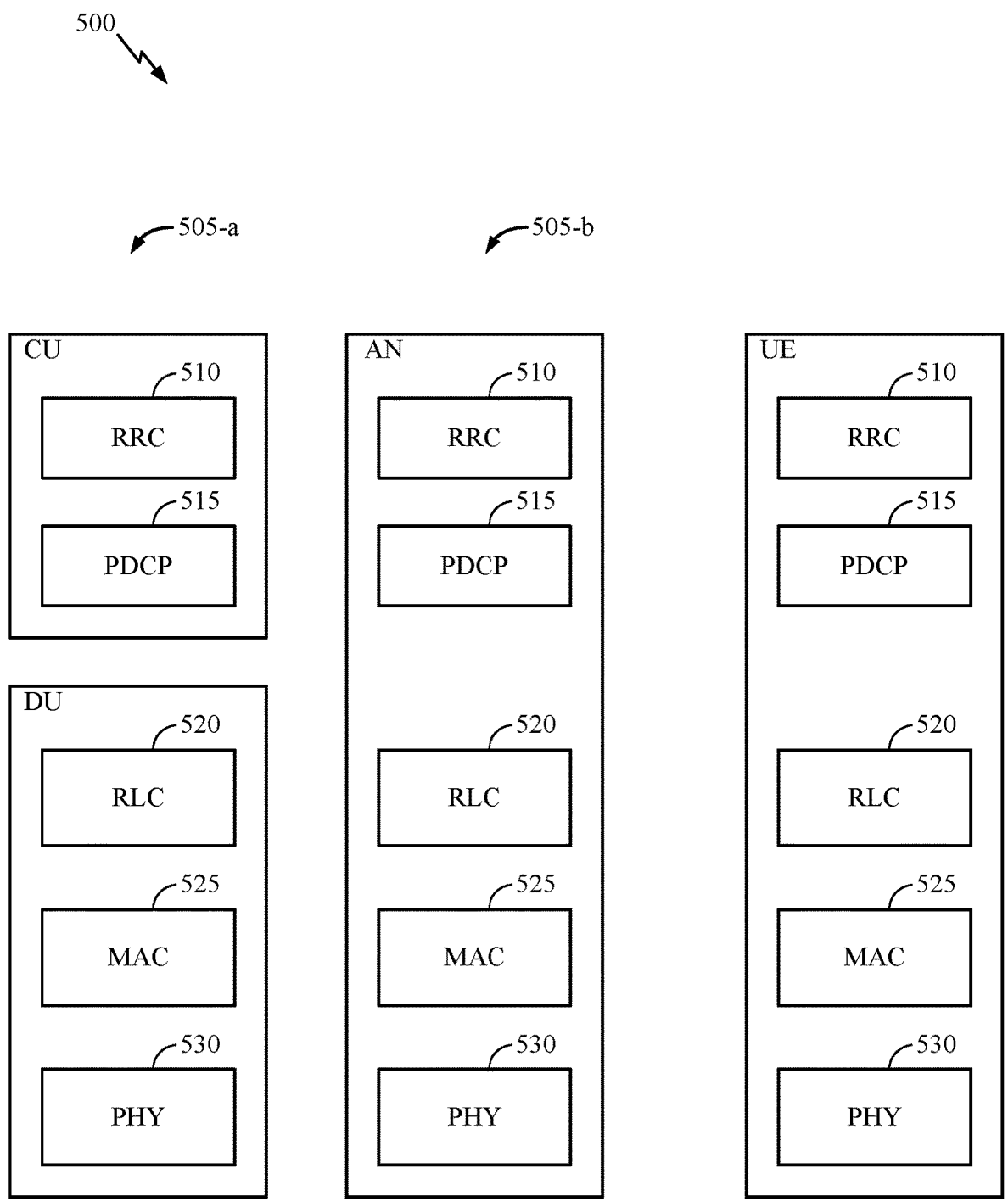
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
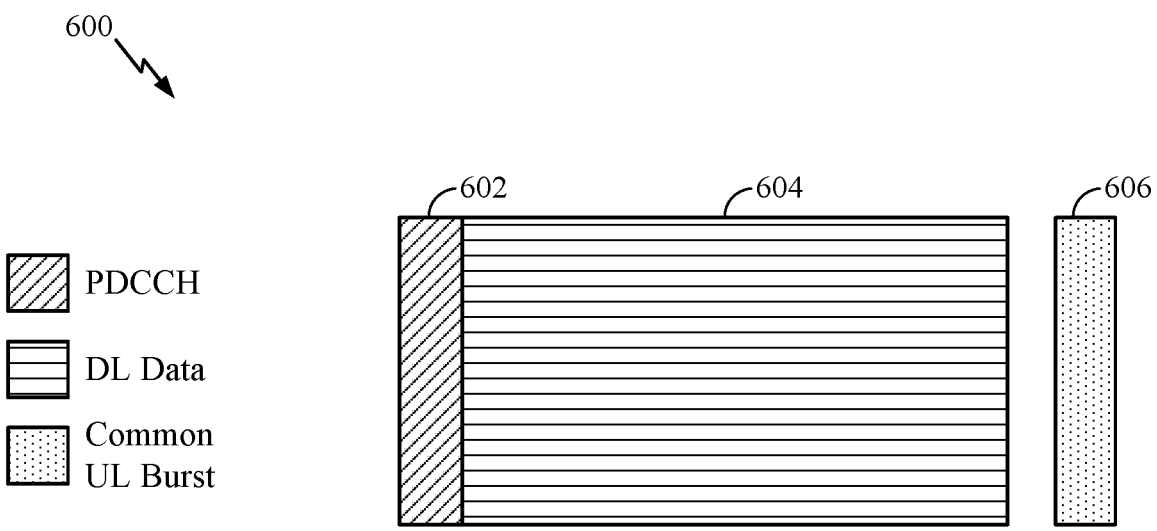
FIG. 6 illustrates an example of a DL-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
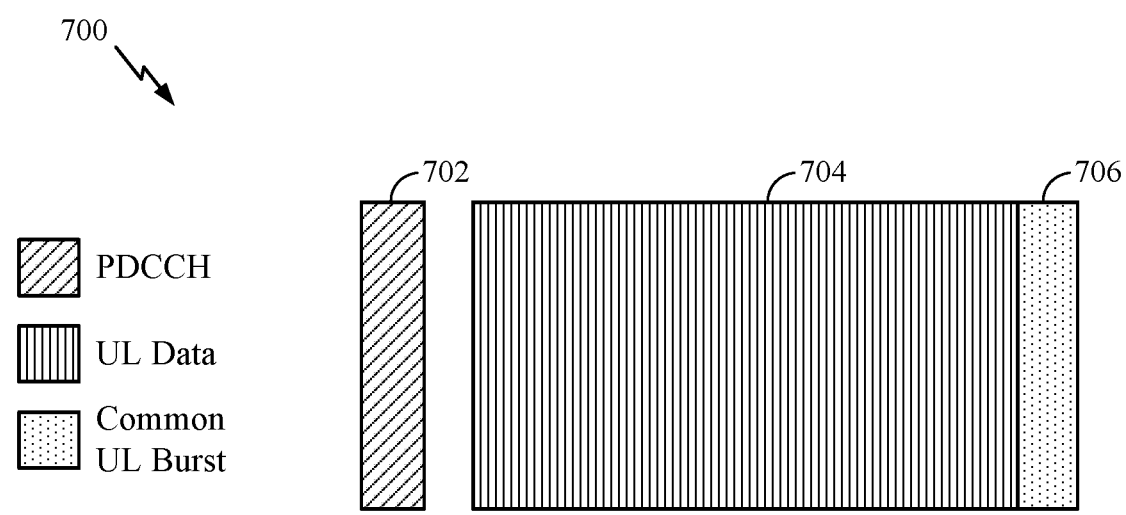
FIG. 7 illustrates an example of an UL-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Signal Transmission and Reception

In certain aspects, a UE 120 may communicate with a BS 110 utilizing OFDM. For example, the UE 120 may transmit signals as OFDM waveforms to BS 110, and further may receive signals transmitted as OFDM waveforms from BS 110. In certain aspects, an OFDM waveform, as discussed, spans a frequency bandwidth and time period. The frequency bandwidth that an OFDM waveform occupies may be referred to as a carrier. In certain aspects, a BS 110 may transmit and/or receive signals on multiple carriers, which may be referred to as component carriers (CCs) (e.g., using carrier aggregation (CA)). Each component carrier used for communication by BSs 110 and UEs 120 may have a different associated frequency (e.g., center frequency of the component carrier).

Figure 8A:
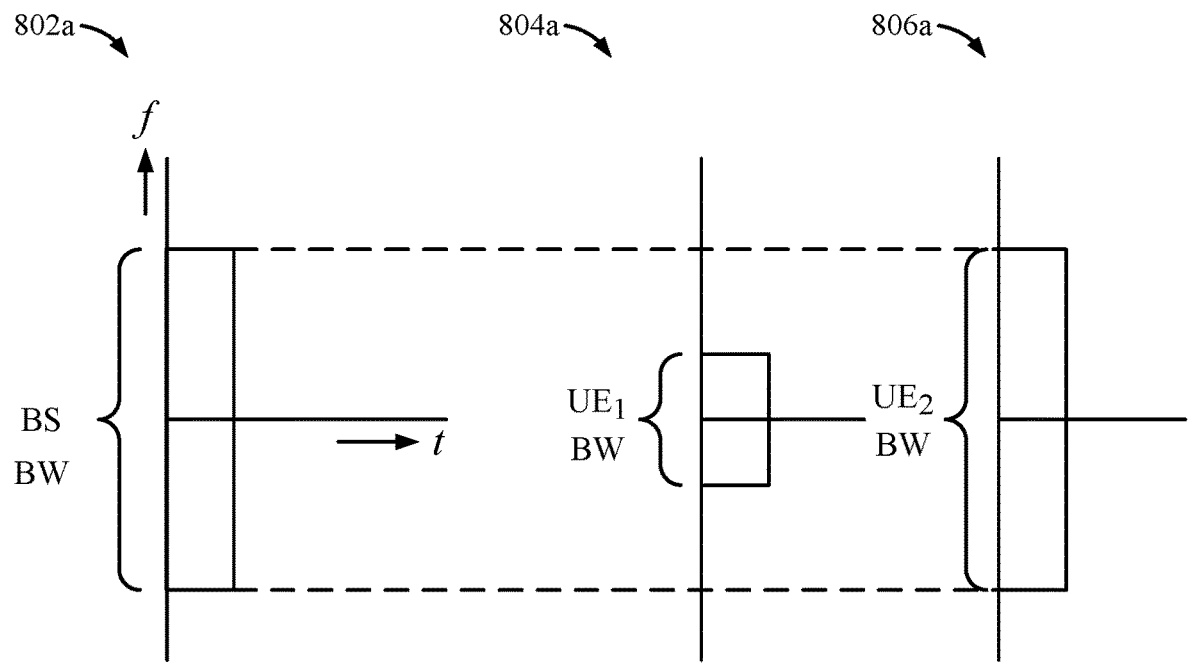
FIG. 8A includes graphs representing example frequency bandwidths used for communication by a BS, a first UE, and a second UE, in accordance with certain aspects of the present disclosure.

FIG. 8A includes graphs 802a, 804a, and 806a representing example frequency bandwidths (e.g., carriers, component carriers, etc.) used for communication by a BS 110, a first UE 120, and a second UE 120, respectively. The frequency bandwidth is shown as a block on the graph, with the y-axis representing frequency (e.g., centered at a center frequency of the carrier, which may be referred to as the carrier frequency). As shown, BS 110 communicates over the same bandwidth as the second UE 120, and the first UE 120 communicates in a narrower bandwidth that overlaps with that bandwidth. As shown in FIG. 8A, the center frequency of the carrier used by each of BS 110, first UE 120, and second UE 120 for communication is the same, however. In certain aspects, the bandwidths shown in FIG. 8A are representative of LTE communications.

Figure 8B:
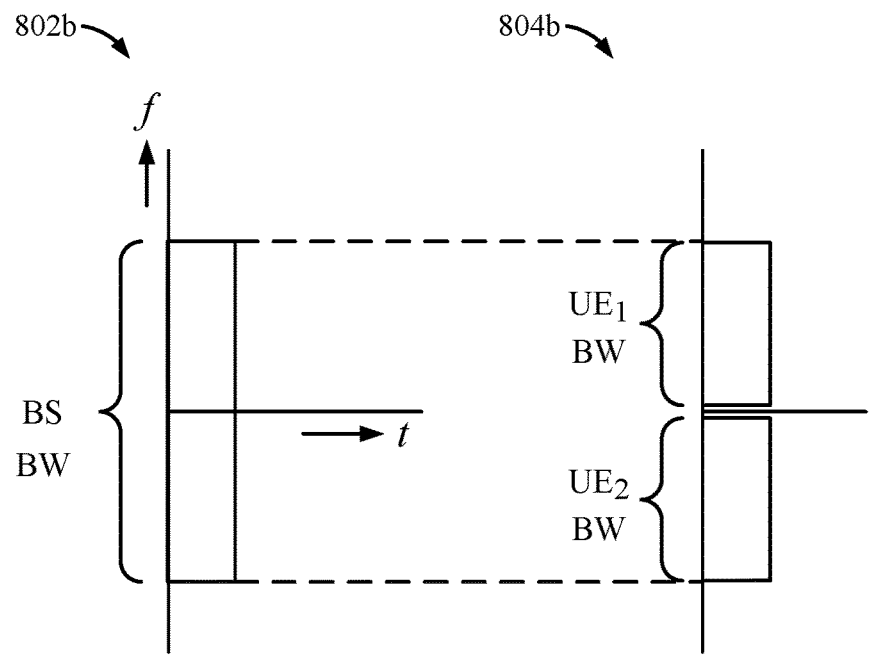
FIG. 8B includes graphs representing example frequency bandwidths used for communication by a BS, a first UE, and a second UE, in accordance with certain aspects of the present disclosure.

FIG. 8B includes graphs 802b and 804b representing example frequency bandwidths used for communication by a BS 110, and a first UE 120 ($UE_1$) and a second UE 120 ($UE_2$), respectively. The frequency bandwidth is shown as a block on the graph, with the y-axis representing frequency (e.g., centered at a center frequency of the carrier). As shown, BS 110 communicates over a first bandwidth. The first UE 120 and the second UE 120 each communicate over a portion of the first bandwidth used by the BS 110 (e.g., separated by a guard band). As shown in FIG. 8B, the center frequency of the carrier (e.g., CC) used by each of BS 110, first UE 120, and second UE 120 for communication is different. In certain aspects, the bandwidths shown in FIG. 8B are representative of NR communications.

In certain aspects, subunits of the frequency bandwidth of the OFDM waveform may be referred to as subcarriers, and subunits of the time period of the OFDM waveform may be referred to as symbols. Accordingly, the OFDM waveform comprises a plurality of frequency resources, which may be referred to as subcarriers, and a plurality of time resources, which may be referred to as symbols. A single subcarrier in a single symbol may be referred to as a resource element (RE), and accordingly, the OFDM waveform may comprise a plurality of REs.

In certain aspects, since the BS 110, first UE 120, and second UE 120 may utilize different carrier frequencies for receiving the same REs, the transmitting device and/or receiving device of the REs may need to compensate for the difference in carrier frequencies, such as utilizing techniques described herein. For example, the phase offsets for each OFDM symbol the OFDM waveform is received on may need to be adjusted based on the difference in carrier frequencies.

In certain aspects, each RE of an OFDM waveform may be described by a pair of parameters including an RE index (e.g., tone index) relative to a zero tone location (e.g., center frequency of the carrier or CC used for transmission/reception of the OFDM waveform), and an absolute frequency of the zero tone location. For example, the zero tone location (Z) may be defined as a particular frequency (e.g., 1 GHz) of the RE at index 0 and the RE index (N) may indicate an offset in frequency from the zero tone location. For example, for a given OFDM waveform, adjacent subcarriers in frequency may be spaced apart by a frequency value referred to as a subcarrier spacing (SCS) (e.g., each subcarrier occupies a frequency band equal to the SCS). Each RE index, accordingly, may indicate an offset in frequency from the zero tone location that is an integer multiple of the SCS. In particular, in certain aspects, the RE index may be an integer (e.g., a positive or negative integer N) and the starting frequency of the subcarrier of an RE may be equal to the zero tone location+the product of the RE index and SCS (i.e., Z+N*SCS). For example, assuming a SCS of 15 kHz, and a zero tone location of 1 GHz, the RE with RE index 0 starts at 1 GHz, the RE with RE index 1 starts at 1 GHz+15 kHz, the RE with RE index 2 starts at 1 GHz+30 kHz, etc.

In certain aspects, the time-continuous signal $s_l^{(p,\mu)}(t)$, on antenna port p of a device such as BS 110 or UE 120 and subcarrier spacing configuration $\mu$ for OFDM symbol l in a subframe for any physical channel or signal except PRACH is defined by:

$$s_l^{(p,\mu)}(t) = \sum_{k=0}^{N_{grid}^{size,\mu} N_{sc}^{RB}-1} a_{k,l}^{(p,\mu)} \cdot e^{j2\pi\left(k+k_0^\mu - N_{grid}^{size,\mu} N_{sc}^{RB}/2\right)\Delta f\left(t - N_{CP,l}^\mu T_c\right)}$$

where $0 \le t < (N_u^\mu + N_{CP,l}^\mu)T_c$, and the starting position of OFDM symbol l for subcarrier spacing configuration in a subframe is given by $$t_{start,l}^\mu = \begin{cases} 0 & l = 0 \\ t_{start,l-1}^\mu + (N_u^\mu + N_{CP,l-1}^\mu) \cdot T_c & \text{otherwise} \end{cases}$$

Using the OFDM symbol generation equation above, each RE can be described with a pair of parameters as discussed: 1) RE (tone) index relative to a zero tone location and 2) absolute frequency of the zero tone location.

In certain aspects, a device (e.g., BS 110 or UE 120, a transmitting or receiving device) defines a RE by the RE index and the zero tone location of the RE. In particular, in some aspects, the device may assume or be configured with a RE index and zero tone location that defines the RE. For example, the device may assume a zero tone location that is at or near the center frequency of an OFDM waveform (e.g., center frequency of a carrier corresponding to the OFDM waveform) to be transmitted or received by the device. In certain aspects, the device is configured or informed (e.g., by wireless network 100) about the RE index and zero tone location (e.g., carrier) of an RE. The device may be configured to utilize the RE index and zero tone location to process the OFDM waveform (e.g., the RE in the OFDM waveform) for transmission or when received. In particular, the device may apply phase offsets to the OFDM waveform and perform other processing (e.g., determine a time domain pass band) of the REs based on the RE index and zero tone location.

For example, the device may determine or assume different characteristics (e.g., center frequency/carrier frequency) for the OFDM waveform corresponding to the RE based on the RE index and the zero tone location. In certain aspects, the zero tone location may be based on or indicative of a carrier used for communication by the UE 120. Since different devices may use different carrier frequencies to receive the OFDM waveform, they may assume a different RE index and zero tone location, and accordingly process the OFDM waveform differently (e.g., based on a different center frequency). If a transmitter processes the OFDM waveform one way, and the receiver another way, the receiving device may not successfully decode the OFDM waveform to retrieve the data in the OFDM waveform. Accordingly, it is important for the device to determine the correct characteristics of the OFDM waveform (e.g., OFDM waveform type) to be able to properly process a received OFDM waveform.

In certain aspects, two different UEs 120 may receive the same OFDM waveform corresponding to the same RE. However, the different UEs 120 may assume that different parameters define the RE (e.g., based on different carriers used by the different UEs 120 for communication). For example, a first UE 120 may assume that a particular RE is defined by an RE index of 10 (with a SCS of 30 kHz) and a zero tone location of 1 GHz. A second UE 120 may assume the same RE is defined by an RE index of 110 (with a SCS of 30 kHz) and a zero tone location of 0.997 GHz. In particular, both parameter pairs assumed by the first UE 120 and second UE 120 define the same subcarrier. However, since the first UE 120 and second UE 120 assumed a different RE index and zero tone location, they would then assume different OFDM waveform types for the same OFDM waveform. Accordingly, a BS 110 may not be able to transmit the same OFDM waveform (e.g., corresponding to a RE) to multiple UEs 120, as the UEs 120 may assume different OFDM waveform types for processing the OFDM waveform, but the BS 110 can only generate the OFDM waveform as a single type.

For example, certain issues arise when common signals need to be transmitted or received by multiple UEs. For example, if UE 120 and BS 110 assume different zero tone locations, the phase of received signals may rotate from symbol to symbol in a noiseless channel with zero fading.

Accordingly, certain aspects relate to each device (e.g., UE 120 or BS 110) (e.g., in a wireless network 100) assuming the same zero tone location for describing signals that are communicated (e.g., independent of a carrier used for communicating the signals). For example, each device, for a received signal or a signal to be transmitted, may assume the same (e.g., common) zero tone location for REs in the OFDM waveform corresponding to the signal to determine the waveform type of the OFDM waveform and for processing the OFDM waveform accordingly. Accordingly, even though each device may utilize different carriers with different carrier frequencies (e.g., normally associated with different actual zero tone locations) for transmitting/receiving the OFDM waveform, the same common zero tone location is used to process the OFDM waveform at the transmitter and/or receiver of the OFDM waveform to compensate for the difference in carrier frequencies. For example, each of the transmitter and/or receiver device of the OFDM waveform may apply a series of phase offset values, as described herein, based on the difference between the assumed common zero tone location and the actual zero tone location/carrier used for the OFDM waveform at the transmitter and/or receiver device.

In certain aspects, each device assumes, is configured, etc., that the common zero tone location is 0 Hz. In certain aspects, each device assumes that the common zero tone location is the closest point to 0 Hz on a particular frequency raster. For example, a frequency raster may be defined by a raster step, which is the smallest commonly used SCS value for the devices in the wireless network 100. The frequency raster may further be defined such that raster points are aligned with the actual absolute RE frequencies used for the signal. For example, for each RE in the OFDM waveform, each absolute starting frequency of the subcarrier of each RE aligns with a raster point. For example, raster points may be defined as frequencies that are an integer number (e.g., positive and/or negative) of raster steps from the zero tone location. For example, if a zero tone location is 10 Hz, and the raster step size is 1 Hz, raster points may be κ, 6, 7, 8, 9, 10, 11, 12, 13, 14 Hz, etc.

In one example, assuming the most commonly used SCS value is f=15 kHz, and where the absolute RE frequencies for REs of an OFDM waveform start at Z=1 GHz (e.g., the actual zero tone location Z is 1 GHz) and have an actual SCS of 30 kHz, (e.g., REs are at 1 GHz, 1 GHz+30 kHz, 1 GHz+60 kHz, etc.), a common zero tone location ($\Delta$) may be given by the formula $\Delta = Z - k^*f$, where k is an integer chosen to minimize $|\Delta|$. In this example, $\Delta = 1$ GHz$-k^*15$ kHz, so k=66,667, and $\Delta = -5$ kHz. In certain aspects, if there are two k values that minimize $|\Delta|$, the smaller k value is selected to result in a positive $\Delta$ value.

Accordingly, the device, for determining OFDM waveform type corresponding to an RE (e.g., for receiving a signal or generating a signal for transmission), would assume a common zero tone location $\Delta$ and an RE index relative to $\Delta$. It should be noted that $-f/2 < \Delta <= f/2$ in all cases. In certain aspects, the actual zero tone location for the OFDM waveform would be a carrier frequency much larger than $\Delta$ (e.g., close to the center frequency of the OFDM waveform).

In certain aspects, to account for the difference between the assumed common zero tone location and the actual zero tone location for processing an OFDM waveform, a transmitting/receiving device applies a time series of phase offset values to the REs of an OFDM waveform for processing the REs (e.g., the device adjusts the phase of the REs by the phase offset value corresponding to the symbol of the REs). For example, the phase offset value may be common or the same for all REs in an OFDM waveform within the same symbol (e.g., OFDM symbol), but may vary between symbols. In certain aspects, the phase offset value between adjacent OFDM symbols is accumulative. For example, the phase offset values for adjacent OFDM symbols ordered in time as 1, 2, 3, etc., may be $\theta_1$, $\theta_1+\theta_2$, $\theta_1+\theta_2+\theta_3$, etc., respectively.

In certain aspects, the series of phase offset values have a 1 ms periodicity. Accordingly, the phase offset may be defined as zero at the beginning of a 1 ms subframe. In some examples, the accumulated phase offset C within a 1 ms subframe may be calculated as follows:

Assuming a 15 kHz SCS, and a normal CP:

$C=m*15 \text{ kHz}*[\text{accumulated CP time within 1 ms}]*2*\pi$, where $m$ is an arbitrary integer;

where [accumulated CP time within 1 ms]=1 ms−14*[symbol duration without CP]=1 ms−14*1/15 kHz=1 ms/15; and therefore $C=m*2*\pi=0$.

Assuming a 15 kHz SCS, and an extended CP:

$C=m*15 \text{ kHz}*[\text{accumulated CP time within 1 ms}]*2*\pi$, where $m$ is an arbitrary integer;

where [accumulated CP time within 1 ms]=1 ms−12*[symbol duration without CP]=1 ms−14*1/15 kHz=3 ms/15; and therefore $C=3*m*2*\pi=0$.

Assuming a 30 kHz SCS, and a normal CP:

$C=m*15 \text{ kHz}*[\text{accumulated CP time within 1 ms}]*2*\pi$, where $m$ is an arbitrary integer;

where [accumulated CP time within 1 ms]=1 ms−28*[symbol duration without CP]=1 ms−28*1/30 kHz=1 ms/15; and therefore $C=m*2*\pi=0$.

Figure 9:
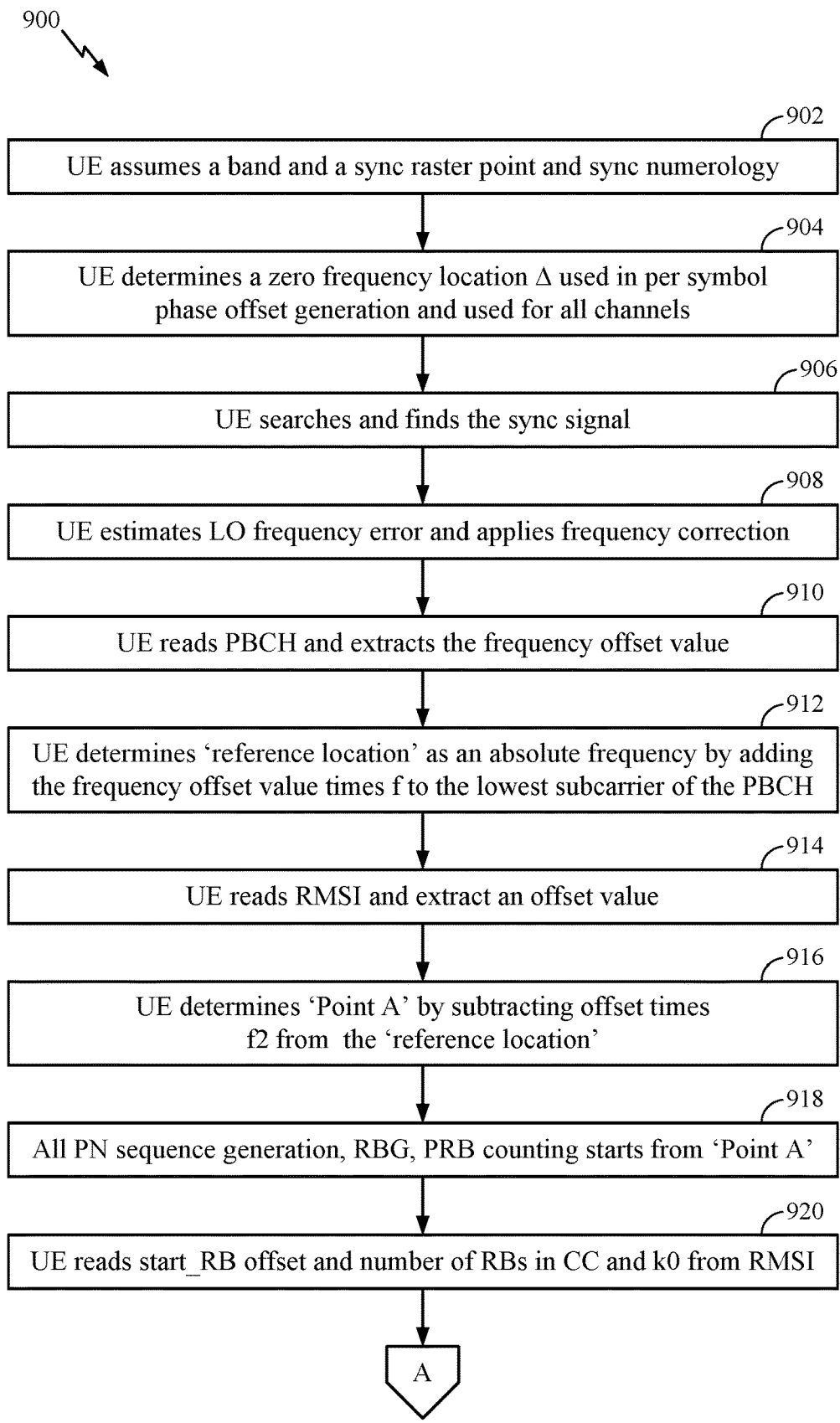
FIGS. 9-9A illustrate example operations that may be performed by a device such as a base station (BS) or UE for processing signals, in accordance with aspects of the present disclosure.
Figure 9A:
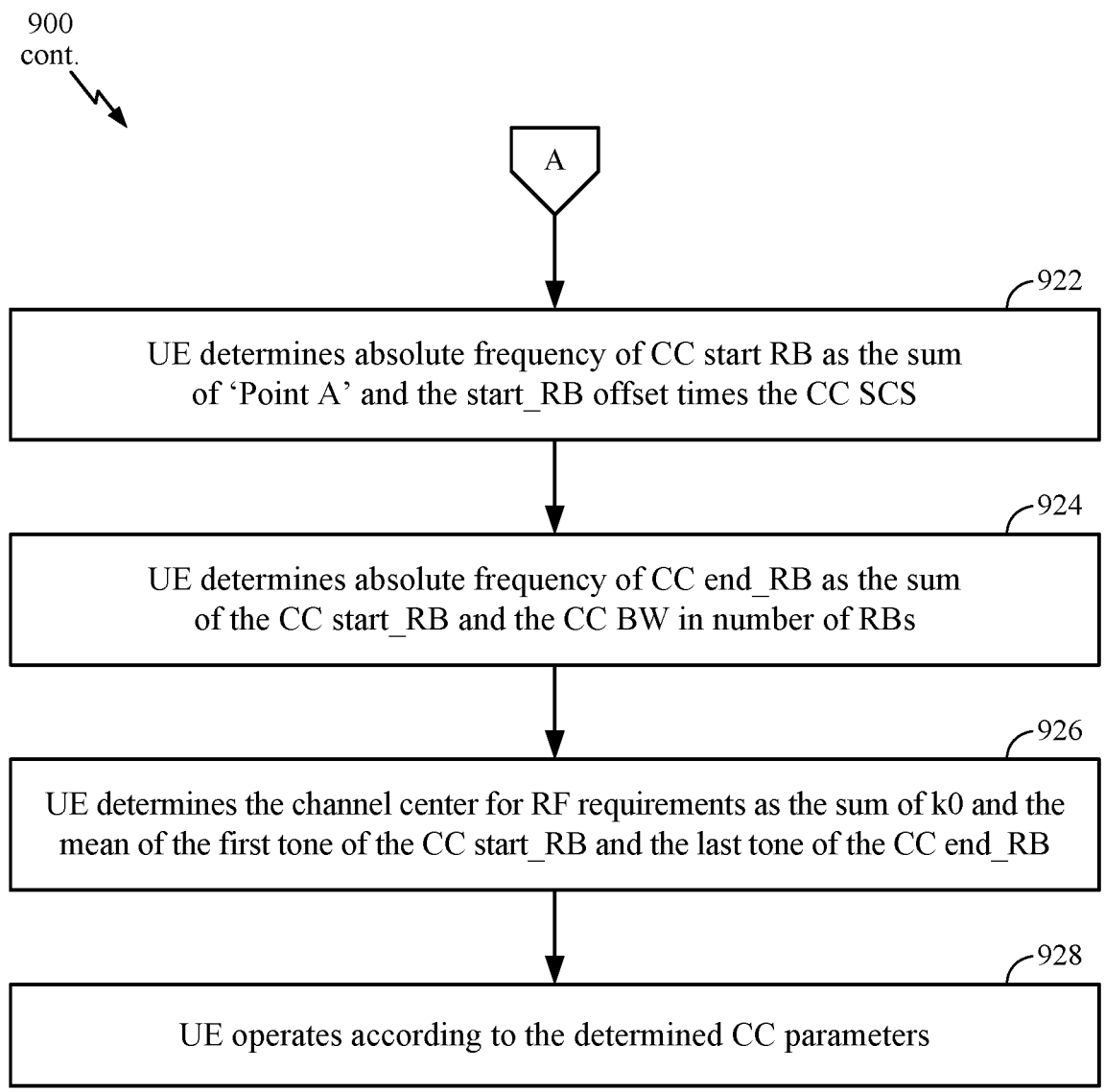

FIGS. 9-9A illustrate example operations 900 that may be performed by a device such as a base station (BS) (e.g., BS 110) or UE (e.g., UE 120) for processing signals, in accordance with aspects of the present disclosure.

Operations 900 begin, at 902, by UE 120 assuming a band (e.g., starting frequency/zero tone location of REs of an OFDM waveform), sync raster point (e.g., most commonly used SCS value), and sync numerology (e.g., actual SCS value of OFDM waveform). At 904, the UE 120 determines the common zero tone location (Δ) used in per symbol phase offset generation, as described herein. For example, as discussed, the phase offset generation in a given symbol may be the same for all frequencies (e.g., channels, subcarriers, etc.) At 906, the UE 120 searches for a signal (e.g., sync signal) based on the assumed parameters at 902, and herein it is assumed the UE 120 finds the signal. At 908, the UE 120 estimates a local oscillator (LO) (e.g., in the UE 120) frequency error and applies frequency correction to the signal based on the frequency error estimated. In certain aspects, the sync raster is large enough such that misidentification of frequency does not occur. At 910, the UE 120 reads PBCH and extracts a frequency offset value from PBCH. For example, the frequency offset value may be a 4-bit value or a 5-bit value (e.g., in mmWave systems). At 912, the UE 120 determines a reference location as an absolute frequency by adding the frequency offset value times f to the lowest subcarrier of the PBCH. In certain aspects, such as where the frequency offset value is 5-bits, f is 15 kHz. In certain aspects, such as where the frequency offset value is 4-bits, f is the random mobile subscriber identity modulation coding scheme (RMSI MCS) (e.g., of the UE 120) (e.g., in the signal or PBCH).

At 914, the UE reads the RMSI (e.g., in the signal or PBCH) and extracts an offset value from the RMSI (e.g., a 12-bit offset value in the range 0, 2, . . . , (275*8−1)). At 916, the UE determines a first point A by subtracting the determined offset determined at 914 times f2 from the reference location determined at 912. In certain aspects, f2 is 180 kHz. In certain aspects, such as mmWave, f2 is 720 kHz. At 918, at the UE 120 all pseudo-noise code sequence (PN sequence) generation, resource block groups (RBG), and physical resource block (RB) (PRB) counting starts from point A.

At 920, the UE 120 reads the start RB offset and number of RBs in a CC corresponding to the signal and k0 from the RMSI. At 922, the UE 120 determines the absolute frequency of the starting RB of the CC (start RB) as the sum of point A and the start_RB offset times the CC SCS. At 924, the UE 120 determines the absolute frequency of the ending RB of the CC (end RB) as the sum of the CC start_RB frequency and the CC bandwidth in number of RBs.

At 926, the UE determines the channel center for radio frequency (RF) requirements as the sum of k0 (e.g., one of 0, +6, or −6 in units of tones of the CC numerology) and the mean of the first tone of the CC start_RB and the last tone of the CC end_RB. At 928, the UE 120 operates according to the determined CC parameters.

Figure 10:
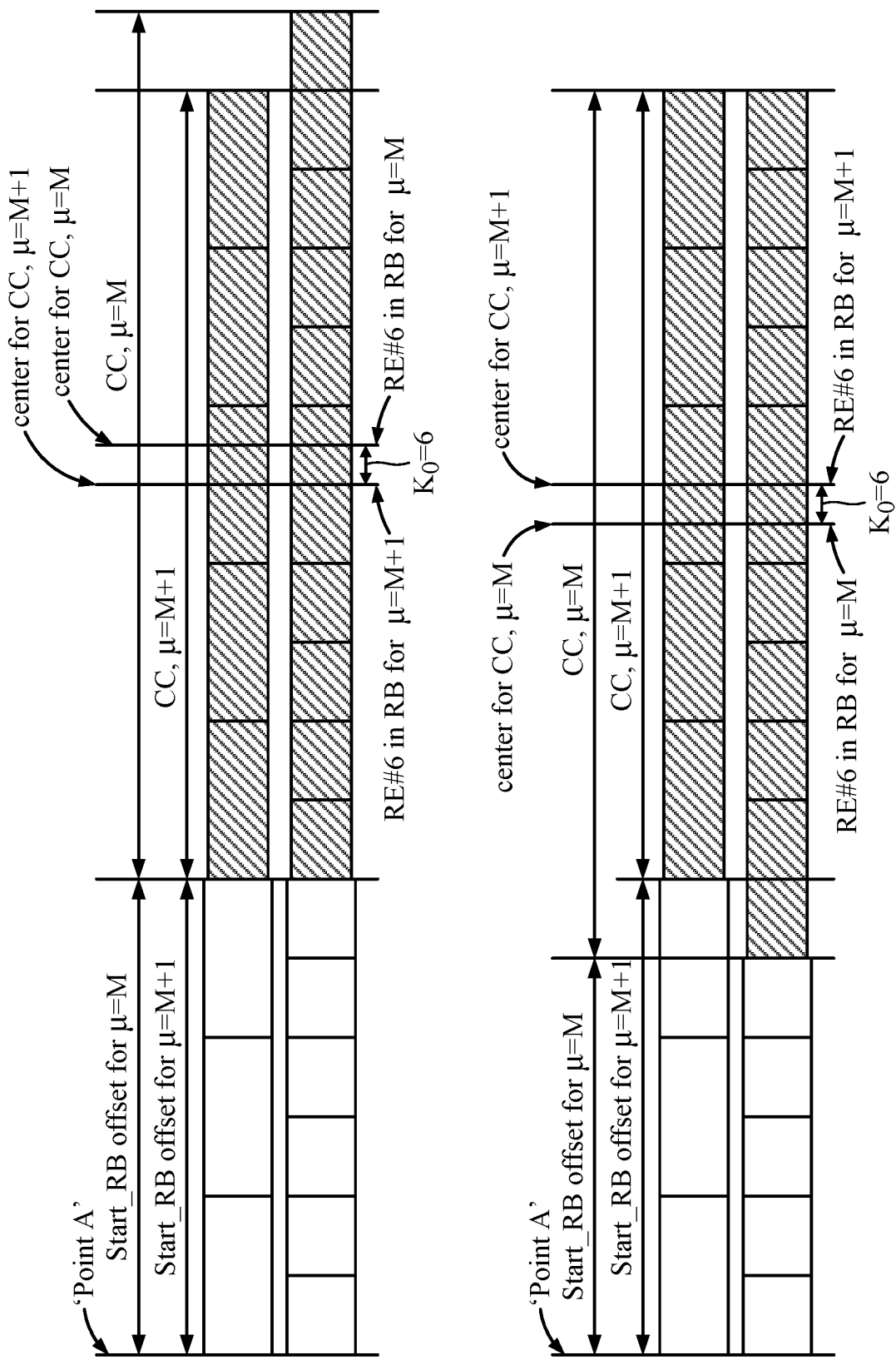
FIG. 10 illustrates an example of parameters determined according to operations of FIGS. 9-9A.

FIG. 10 illustrates an example of parameters determined according to operations 900.

FIGS. 11-18 illustrate example equations and systems for performing the techniques described herein. For example, FIGS. 11 and 12 illustrate examples of using equations that do not compensate for different zero tone locations for processing REs of the same OFDM waveform at different devices. In FIG. 11, the carrier frequencies used by a first device and a second device are the same, and therefore the processing of the OFDM waveform results in the same values. However, in FIG. 12, the carrier frequencies used by a first device and a second device are different, and therefore the processing of the OFDM waveform results in different values.

Accordingly, FIG. 13 illustrates equations for applying a phase correction (e.g., pre-compensation) based on the difference between the assumed common zero tone location for an OFDM waveform and the actual zero tone location (e.g., center frequency) of the carrier used to transmit the OFDM waveform. The phase correction here is applied at the device transmitting the OFDM waveform. Therefore, each device can process the OFDM waveform properly. For example, the boxed region of FIG. 13 illustrates that a phase correction is applied to the OFDM waveform to account for the difference between the assumed common zero tone location for an OFDM waveform and the actual zero tone location.

FIG. 15 similarly illustrates equations for applying a phase correction (e.g., post compensation) based on the difference between the assumed common zero tone location for an OFDM waveform and the actual zero tone location (e.g., center frequency) of the carrier used to receive the OFDM waveform. The phase correction here is applied at the device receiving the OFDM waveform. As shown, the phase correction applied at the receiving device, in certain aspects, may be the complex conjugate of the phase correction applied at the transmitting device.

Therefore, both the transmitting device and receiving device, even if communicating on different center frequencies, may correct to the same phase. This may help ensure channel estimation can be performed properly at a device receiving the OFDM waveform. In particular, since phase offset may vary from symbol to symbol due to the difference in carrier frequencies, the channel estimate for one symbol may not be suitable for a channel estimation for another symbol. However, since here phase offset is corrected for, there is not variation in phase from symbol to symbol and channel estimation can be performed.

FIG. 19 illustrates example operations 1900 that may be performed by a device such as a base station (BS) (e.g., BS 110) or UE (e.g., UE 120) for processing signals, in accordance with aspects of the present disclosure.

Operations 1900 begin, at 1902, by assuming, at a device, a first signal corresponds to a first zero tone location comprising a first frequency, wherein the first signal actually corresponds to a second zero tone location comprising a second frequency that is different than the first frequency.

At 1904, the device applies a phase correction to the first signal to compensate for a difference between the first zero tone location and the second zero tone location.

As discussed, assumption of a different center frequency at BS 110 and UE 120 can lead to phase rotation across different symbols of received signals. Accordingly, certain aspects herein relate to phase compensation techniques (e.g., a phase compensation model) for a transmitter (e.g., BS 110 or UE 120) and a receiver (e.g., UE 120 or BS 110).

Figure 20:
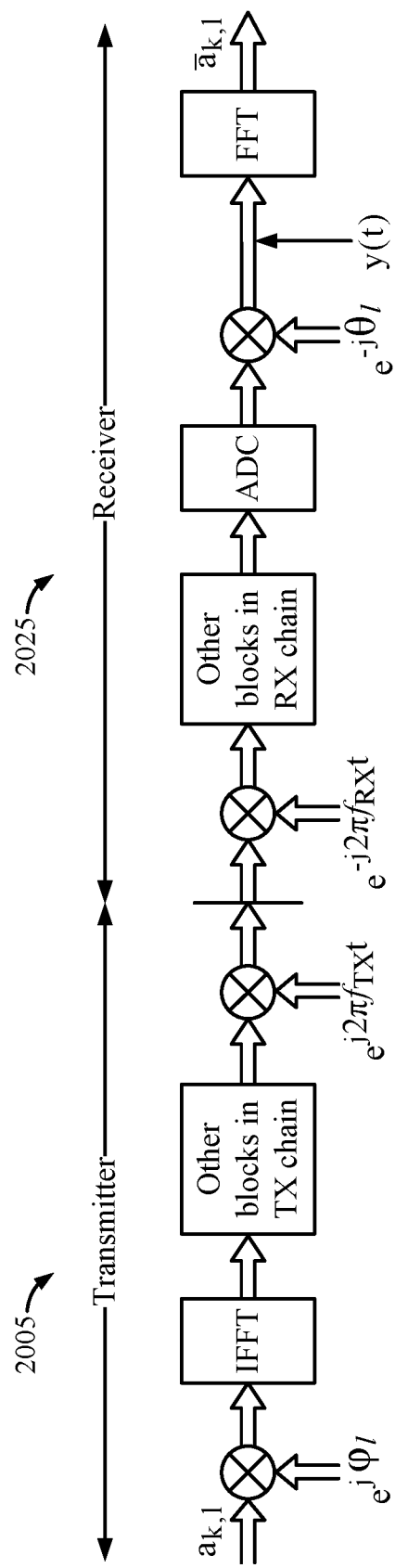
FIG. 20 illustrates an example block diagram of a transmitter and receiver that perform phase compensation due to assuming different center frequencies (e.g., zero tone locations), in accordance with aspects of the present disclosure.

FIG. 20 illustrates an example block diagram of a transmitter and receiver that perform phase compensation due to assuming different center frequencies (e.g., zero tone locations), in accordance with aspects of the present disclosure. The transmitter 2005 may be included in one or more of BS 110 or UE 120 as part of a transmit chain, and the receiver 2025 may be included in one or more of BS 110 or UE 120 as part of a receive chain. In certain aspects, BS 110 is described as the transmitting device with transmitter 2005, for illustrative purposes. In certain aspects, UE 120 is described as the receiving device with receiver 2025, for illustrative purposes.

In certain aspects, transmitter 2005 and receiver 2025 assume no noise and fading.

In certain aspects, the signal at receiver 2025 before application of the FFT can be defined by the following equation:

$$y(t) = \sum_l \sum_k a_{k,l} \cdot e^{j\phi_l} \cdot e^{j2\pi(k+k_0^\mu - N_{grid}^{size,\mu} N_{sc}^{RB}/2)\Delta f(t - t_{start,l}^\mu - N_{CP,l}^\mu T_c)}$$

$$w(t - t_{start,l}^\mu) \cdot e^{j2\pi(f_{TX} - f_{RX})t} \cdot e^{-\theta_l}$$

Where, window function w(t) is defined as, $$w(t) = \begin{cases} 1 & 0 \le t \le (N_u^\mu + N_{CP,l}^\mu)T_C \\ 0 & \text{otherwise} \end{cases}$$

Now, y(t) can be written as, $$y(t) = \sum_l \sum_k a_{k,l} \cdot e^{j(\phi_l - \theta_l + 2\pi(f_{TX} - f_{RX})(t_{start,l}^\mu + N_{CP,l}^\mu T_c))}$$

$$e^{j2\pi(((k+k_0^\mu - N_{grid}^{size,\mu} N_{sc}^{RB}/2)\Delta f) + (f_{TX} - f_{RX}))(t - t_{start,l}^\mu - N_{CP,l}^\mu T_c)} \cdot w(t - t_{start,l}^\mu).$$

In certain aspects, if $f_{TX} - f_{RX} = n\Delta f$ in order to avoid phase rotation across different symbols of the received signal, the following may need to be satisfied, $$\phi_l - \theta_l + 2\pi(f_{TX} - f_{RX})(t_{start,l}^\mu + N_{CP,l}^\mu T_c) = 0$$

In other words, if phase pre-compensation at transmitter 2005 and post-compensation at receiver 2025 satisfies the following equation, phase across different symbols of the received signal will not be rotated.

$$\phi_l + 2\pi f_{TX}(t_{start,l}^\mu + N_{CP,l}^\mu T_c) = \theta_l + 2\pi f_{RX}(t_{start,l}^\mu + N_{CP,l}^\mu T_c) \quad (1)$$

In certain aspects, which may be referred to as option 1, a BS 110 may pre-compensate phase of OFDM symbols of SS/PBCH using a center frequency of SS/PBCH. In certain such aspects, a BS 110 pre-compensates phase of OFDM symbols of RMSI PDCCH and PDSCH using a center frequency of SS/PBCH. In certain such aspects, for other signals/channels, BS 110 does not pre-compensate phase. In certain such aspects, UE 120 utilizes channel bandwidth and k0 signalling in RMSI for any needed compensation. In certain such aspects, phase pre-compensation and post-compensation terms depend on the transmitted signal. For example, UE 120 acting as a receiver may not have to post compensate phase during SS block reception. However, it may have to post-compensate phase based on the difference between the center frequency of SS/PBCH and that of RMSI while receiving RMSI signal. Similarly, UE 120 may have to post-compensate phase based on the difference between the center frequency of transmit carrier frequency and receive carrier frequency while receiving signals other than SS/PBCH and RMSI.

In certain aspects, which may be referred to as option 2, BS 110 pre-compensates phase of OFDM symbols of SS/PBCH using a center frequency of SS/PBCH. In certain such aspects, BS 110 pre-compensates phase of OFDM symbols of RMSI PDCCH and PDSCH using a center frequency of RMSI CORESET. In certain such aspects, for other signals/channels, BS 110 does not pre-compensate phase. In certain such aspects, UE 120 utilizes channel bandwidth and k0 signalling in RMSI for any needed compensation. In certain such aspects, phase pre-compensation and post-compensation terms depend on the transmitted signal. For example, BS 110 acting as a transmitter may have to pre-compensate phase using the center frequency of SS/PBCH and RMSI while transmitting SS/PBCH and RMSI respectively. UE 120 may not have to post-compensate phase terms while receiving these signals. However, UE 120 may have to post compensate phase based on the difference between the center frequency of transmit carrier frequency and receive carrier frequency while receiving signals other than SS/PBCH and RMSI.

In certain aspects, which may be referred to as option 3, BS 110 pre-compensates all OFDM symbols using its own center frequency.

In certain aspects, using different phase pre-compensation and post-compensation terms for different channels does not lead to a unified design of an OFDM symbol generate method. For example, OFDM symbol generation methodology may have to be described differently for different channels to handle these scenarios. Further, BS 110 may have to simultaneously transmit different channels. Both option 1 and option 2 may force BS 110 to use different phase compensation terms simultaneously across different channels. Hence, in certain aspects, wireless communication systems, such as NR, may support pre-compensation and post-compensation phase terms that are invariant across different channels.

Certain aspects herein relate to both transmitter 2005 and receiver 2025 using phase compensation terms that do not depend on individual channels. This may be similar to option 3, where phase compensation terms only depend on the carrier frequencies being used by transmitter 2005 and receiver 2025. In certain aspects, option 3 assumes the zero tone for signal generation to be κ Hz and satisfies equation (1) through the following relationship:

$$\varphi_l = 2\pi f_{TX}(t_{start,l}^\mu + N_{CP,l}^\mu T_c) \quad (2)$$

$$\theta_l = 2\pi f_{RX}(t_{start,l}^\mu + N_{CP,l}^\mu T_c) \quad (3)$$

Hence, in certain aspects, option 3 can be defined as the phase compensation method where the zero tone assumed for phase compensation is absolute 0 Hz. Such an option 3 may be referred to as option 3-A.

It should be noted that other choices of phase compensation could still satisfy equation (1). For example, as long as $f_{TX} - f_{RX} = n\Delta f_{ref}$, where $\Delta f_{ref}$ is the smallest commonly used subcarrier spacing, e.g., 15 kHz, equation (1) could have been satisfied with following method as well:

$$\varphi_l + 2\pi f_{TX}(t_{start,l}^\mu + N_{CP,l}^\mu T_c) = \theta_l + 2\pi f_{RX}(t_{start,l}^\mu + N_{CP,l}^\mu T_c) = 2\pi \delta(t_{start,l}^\mu + N_{CP,l}^\mu T_c) \quad (4)$$

And, $$\varphi_l = 2\pi k_{TX} \Delta f_{ref}(t_{start,l}^\mu + N_{CP,l}^\mu T_c) \quad (5)$$

$$\theta_l = 2\pi k_{RX} \Delta f_{ref}(t_{start,l}^\mu + N_{CP,l}^\mu T_c) \quad (6)$$

Where, $$k_{TX} = \arg\min_{k \in Z^+} |f_{TX} - k\Delta f_{ref}|, \delta = \min_{k \in Z^+} |f_{TX} - k\Delta f_{ref}| \quad (7)$$

$$k_{RX} = \arg\min_{k \in Z^+} |f_{RX} - k\Delta f_{ref}|, \delta = \min_{k \in Z^+} |f_{RX} - k\Delta f_{ref}| \quad (8)$$

As long as, $$f_{TX} - f_{RX} = n\Delta f, \min_{k \in Z^+} |f_{TX} - k\Delta f_{ref}| = \min_{k \in Z^+} |f_{RX} - k\Delta f_{ref}| = \delta$$

The phase compensation methods shown above (e.g., with respect to equations 4-8) can be defined as the method where the zero tone assumed for phase compensation is the closest point to 0 Hz in a particular frequency raster. Such an option 3 may be referred to as option 3-B.

For example, if transmit carrier frequency is 1 GHz and reference subcarrier spacing is 15 kHz, $k_{TX} = 66,667$ and $\delta = -5$ kHz.

In certain aspects, option 3-B can reduce the number of phase compensation hypothesis used during frequency offset estimation in some frequency bands.

In certain aspects, frequency positions of SS blocks in different frequency bands may be defined as follows:

| Frequency range | SS block frequency position $SS_{REF}$ | Range of GSCN |
|---|---|---|
| 0-2650 MHz | N*900 kHz + M*5 kHz, N = 1:[2944], M = −1:1 | 1-[8832] |
| 2400-24250 MHz | 2400 MHz + N*1.44 MHz, N = 0:[15173] | [8833-24006] |
| 24250-100000 MHz | [24250.08] MHz + N*[17.28] MHz, N = 0:[4383] | [24007-28390] |

In certain aspects, transmit frequency come in a set of "raster nets", where each "raster net" may contain multiple raster points. In certain aspects, in the 0-2.65 GHz band, the raster points come in nets each having three close raster points. The nets are 900 kHz apart and the smallest distance between the raster points is 5 kHz. Assuming 10 ppm frequency offset at 2.65 GHz leads to a 26.5 kHz offset. Hence, while estimating frequency offset based on SSS and DMRS of PBCH, UE 120 may have to test three hypothesis for the three close raster points (M=−1:1).

With option 3a, where $\theta_l = -2\pi(N*900 \text{ kHz} + M*5 \text{ kHz})(t_{start,l}^\mu + N_{CP,l}^\mu T_c)$, the phase post-compensation terms at the receiver 2025 may vary among three close raster points. Hence, UE 120 may have to try three phase compensation hypothesis for frequency offset estimation. If UE 120 uses only one phase compensation term, it may lead to phase rotation jumps across symbol boundaries, which might be problematic for PBCH and RMSI decoding.

With option 3b, where $\theta_l = -2\pi(N*900 \text{ kHz})(t_{start,l}^\mu + N_{CP,l}^\mu T_c)$, the phase post-compensation terms at the receiver 2025 would be same for all three raster points. Therefore, in certain aspects, in the 0-2.65 GHz range, the number of phase compensation hypothesis for frequency offset estimation in option 3-a will be greater than that in option 3-b.

In certain aspects, phase terms should repeat after a certain time period. This may help ensure that the transmitter 2005 and the receiver 2025 do not need to store a large or infinite number of phase compensation terms.

In certain aspects, as long as the transmitter 2005 and receiver 2025 carrier frequencies are integer multiples of 1 kHz, option 3-A ensures that the phase pre-compensation and post-compensation terms repeat after 1 ms. However, in certain aspects, if the carrier frequencies are not integer multiples of 1 kHz, (e.g., which occurs when UL is shared between RATs such as LTE and NR), option 3-A cannot guarantee the repetition of these phase terms after ever 1 ms.

In certain aspects, since the assumed zero tone in option 3-B occurs in a frequency raster and the raster step is 15 kHz, the phase compensation terms repeat after 1 ms even if the carrier frequencies are not integer multiple of 1 GHz (or 1 kHz).

Accordingly, in certain aspects, transmitter 2005 and receiver 2025 use option 3-B while generating phase compensation terms at transmitter and receiver.

In certain aspects, OFDM symbol generation is performed as follows:

$$s_l^{(p,\mu)}(t) = \sum_{k=0}^{N_{grid}^{size,\mu} N_{sc}^{RB} - 1} a_{k,l}^{(p,\mu)} \cdot e^{-j2\pi k_{TX} \Delta f_{ref}(t_{start,l}^\mu + N_{CP,l}^\mu T_c)}$$

$$e^{j2\pi(k + k_0^\mu - N_{grid}^{size,\mu} N_{sc}^{RB}/2)\Delta f(t - N_{CP,l}^\mu T_c)}$$

Where, $k_{TX} = \arg\min_{k \in Z^+} |f_{TX} - k\Delta f_{ref}|$,
$f_{TX}$ denotes carrier frequency of the transmitter 2005, and $\Delta f_{ref}$ is the smallest commonly used subcarrier spacing, e.g., 15 kHz.

In certain aspects, besides $0 \leq t < (N_u^\mu + N_{CP,l}^\mu)T_c$, the starting position of OFDM symbol l for subcarrier spacing configuration μ in a subframe is given by $$t_{start,l}^\mu = \begin{cases} 0 & l = 0 \\ t_{start,l-1}^\mu + (N_u^\mu + N_{CP,l-1}^\mu) \cdot T_c & \text{otherwise} \end{cases}$$

Accordingly, in certain aspects, such as using the OFDM symbol generation equation above, receiver 2025 can post-compensate receive signal with:
$e^{j2\pi k_{RX} \Delta f_{ref}(t_{start,l}^\mu + N_{CP,l}^\mu T_c)}$ phase at symbol l where, $k_{RX} = \arg\min_{k \in Z^+} |f_{RX} - k\Delta f_{ref}|$ and $f_{RX}$ denotes carrier frequency of the receiver 2025.

In certain aspects, the phase compensation terms should be the same for each raster of the raster nets previously discussed. For example, using the OFDM symbol generation equation above may ensure the same phase compensation terms for all three raster points of each "raster net" because: 1) the "raster nets" are 900 kHz apart from each other, 2) individual raster points are 5 kHz apart from the center of the "raster nets", and 3) 900 kHz is an integer multiple of \f {ref}=15 kHz (e.g. for all three combinations of 895, 900 and 905 kHz, $k_{ix}$ should turn out to be 60). In certain aspects, the same applies to other SSB positions of N*900+M*kHz where N>=2.

However, in certain aspects, the same does not apply where the raster nets are off by a frequency (e.g., 890 kHz) that is not an integer multiple of 15 kHz. For example, frequency positions of SS blocks in a frequency band may be defined as follows:

| Frequency range | SS block frequency position SSREF | Range of GSCN |
|---|---|---|
| 0-X MHz | N*890 kHz + M*5 kHz, N = 1:[2944], M = −1:1 | 1-[8832] |

Accordingly, the individual raster points of the first raster net would be placed at 889, 890, and 895 kHz. The value of $k_1$ is 59 for 885 and 890 kHz; where this value is 60 for 895 kHz raster point.

Accordingly, in certain aspects, the OFDM symbol generation equation may be modified as follows:

$$s_l^{(p,\mu)}(t) = \sum_{k=0}^{N_{grid}^{size,\mu} N_{sc}^{RB}-1} a_{k,l}^{(p,\mu)} e^{-j2\pi k_{TX} \Delta f_{ref}(t_{start,l}^{\mu}+N_{CP,l}^{\mu} T_c)}$$

$$e^{j2\pi \left(k+k_0^{\mu}-\frac{N_{grid}^{size,\mu} N_{sc}^{RB}}{2}\right) \Delta f(t-N_{CP,l}^{\mu} T_c)}$$

Where, $k_{TX}=\text{argmin}_{k \in Z}|f_{TX}-k\Delta f_{ref}-m*5\text{ kHz}|$,

Where, m=M in following frequency band,

| Frequency range | SS block frequency position SSREF | Range of GSCN |
|---|---|---|
| 0-2650 MHz | N*900 kHz + M*5 kHz, N = 1:[2944], M = −1:1 | 1-[8832] | m=0 in other frequency bands, $f_{TX}$ denotes carrier frequency of the transmitter 2005;

$\Delta f_{ref}$ is the smallest commonly used subcarrier spacing, i.e., 15 kHz, besides, $0 \le t < (N_u^{\mu}+N_{CP,l}^{\mu})T_c$, the starting position of OFDM symbol 1 for subcarrier spacing configuration µ in a subframe is given by:

$$t_{start,l}^{\mu} = \begin{cases} 0 & l=0 \\ t_{start,l-1}^{\mu} + (N_u^{\mu}+N_{CP,l-1}^{\mu}) \cdot T_c & \text{otherwise} \end{cases}$$

In certain aspects, the OFDM symbol generation equation may be modified as follows:

$$s_l^{(p,\mu)}(t) = \lambda_l^{\mu} \sum_{k=0}^{N_{grid}^{size,\mu} N_{sc}^{RB}-1} a_{k,l}^{(p,\mu)} e^{j2\pi\left(k+k_0^{\mu}-\frac{N_{grid}^{size,\mu} N_{sc}^{RB}}{2}\right)\Delta f(t-N_{CP,l}^{\mu} T_c)}$$

where $\Delta f_{ref}$=15 kHz, $\lambda_l^{\mu}=e^{-j2\pi \cdot (p_{\mu}\Delta f_{ref}+\Delta)(N_{CP,l}^{\mu} T_c+t_{start,l}^{\mu})}$, and $p_{\mu}=\min(\arg\min_{k\in Z}|f_0-m \times 5\text{ kHz}-k\Delta f_{ref}|)$, m={−1, 0, 1} and equal to the value of M in:

| Frequency range | SS block frequency position SSREF | Range of GSCN |
|---|---|---|
| 0-2650 MHz | N*900 kHz + M*5 kHz, N = 1:[2944], M = −1:1 | 1-[8832] | and m=0 in other bands.

In certain aspects, one of the following is used:
Quantized carrier frequency: Δ=0; or $$\Delta=f_0-k\Delta f_{ref}$$

Accordingly, in certain aspects, while generating phase compensation terms in 0-2.65 GHz, a UE assumes that value of M in SS block frequency position is 0, e.g., a UE assumes that SS blocks are always located at N*900 kHz and then uses the unmodified equation to generate the phase compensation terms.

Accordingly, in certain aspects, $p_{\mu}$ can be written as, $p_{\mu}=\min(\arg\min_{k \in Z}|f_0-M \times 5\text{ kHz}-k\Delta f_{ref}|)$, M={−1, 0, 1} for bands 0-2.65 GHz and M=0 for other bands.

In another aspects, in bands other than 0-2.65 GHz, the value of m or M in the phase compensation term could be 0 if there is no shift in RAN4, meaning if RAN4 does not introduce SS block raster nets where the individual raster points within the raster net are very close (e.g. like 5 kHz in 0-2.65 GHz).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9-9A and/or 19.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, the method comprising:
    applying, at a device, a phase correction to a first signal to compensate for a difference between a first zero tone location comprising a first frequency and a second zero tone location comprising a second frequency, wherein applying the phase correction to the first signal comprises applying a time series of phase offset values to the first signal, wherein the time series of phase offset values are based on the first zero tone location and the second zero tone location; and
    one of:
        transmitting the first signal after applying the phase correction; or
        receiving the first signal prior to applying the phase correction.

2. The method of claim 1, wherein the second zero tone location is specific to the device, and wherein the first zero tone location is common among a plurality of devices.

3. The method of claim 1, wherein the first zero tone location is 0 Hz.

4. The method of claim 1, wherein the time series of phase offset values have a periodicity.

5. The method of claim 4, where the periodicity is 1 ms.

6. The method of claim 1, wherein the time series of phase offset values comprise different accumulative phase offset values for each of a plurality of symbols of the first signal.

7. The method of claim 1, wherein the second zero tone location comprises a carrier frequency of a carrier carrying the first signal.

8. The method of claim 1, wherein the second zero tone location comprises a center frequency of a transmitter of the first signal.

9. The method of claim 1, wherein the first signal comprises an orthogonal frequency-division multiplexing waveform.

10. The method of claim 1, wherein the first signal comprises a plurality of resource elements, each resource element corresponding to a single subcarrier in frequency and a single symbol in time, and wherein the subcarrier of each resource element is defined by the second zero tone location and a resource element index indicative of an offset in frequency of the resource element with respect to the second zero tone location.

11. The method of claim 1, wherein the first zero tone location is the closest point to 0 Hz on a frequency raster defined by a raster step that is a smallest commonly used subcarrier spacing within a wireless network the device communicates in.

12. The method of claim 11, wherein the first signal comprises a plurality of resource elements, wherein a starting frequency of each subcarrier of each of the plurality of resource elements aligns with raster points of the frequency raster, and wherein the raster points are defined as points within an integer number of raster steps from the first zero tone location.

13. A device for wireless communication, the device comprising:
    a memory; and
    a processor coupled to the memory, the processor being configured to:
        apply a phase correction to a first signal to compensate for a difference between a first zero tone location comprising a first frequency and a second zero tone location comprising a second frequency, wherein to apply the phase correction to the first signal comprises to apply a time series of phase offset values to the first signal, wherein the time series of phase offset values are based on the first zero tone location and the second zero tone location; and
        one of:
            transmit the first signal after applying the phase correction; or
            receive the first signal prior to applying the phase correction.

14. The device of claim 13, wherein the second zero tone location is specific to the device, and wherein the first zero tone location is common among a plurality of devices.

15. The device of claim 13, wherein the first zero tone location is 0 Hz.

16. The device of claim 13, wherein the time series of phase offset values have a periodicity.

17. The device of claim 16, where the periodicity is 1 ms.

18. The device of claim 13, wherein the time series of phase offset values comprise different accumulative phase offset values for each of a plurality of symbols of the first signal.

19. The device of claim 13, wherein the second zero tone location comprises a carrier frequency of a carrier carrying the first signal.

20. The device of claim 13, wherein the second zero tone location comprises a center frequency of a transmitter of the first signal.

21. The device of claim 13, wherein the first signal comprises an orthogonal frequency-division multiplexing waveform.

22. The device of claim 13, wherein the first signal comprises a plurality of resource elements, each resource element corresponding to a single subcarrier in frequency and a single symbol in time, and wherein the subcarrier of each resource element is defined by the second zero tone location and a resource element index indicative of an offset in frequency of the resource element with respect to the second zero tone location.

23. The device of claim 13, wherein the first zero tone location is the closest point to 0 Hz on a frequency raster defined by a raster step that is a smallest commonly used subcarrier spacing within a wireless network the device communicates in.

24. The device of claim 23, wherein the first signal comprises a plurality of resource elements, wherein a starting frequency of each subcarrier of each of the plurality of resource elements aligns with raster points of the frequency raster, and wherein the raster points are defined as points within an integer number of raster steps from the first zero tone location.

25. A device for wireless communication, the device comprising:
    means for applying a phase correction to a first signal to compensate for a difference between a first zero tone location comprising a first frequency and a second zero tone location comprising a second frequency, wherein applying the phase correction to the first signal comprises applying a time series of phase offset values to the first signal, wherein the time series of phase offset values are based on the first zero tone location and the second zero tone location; and
    one of:
        means for transmitting the first signal after applying the phase correction; or
        means for receiving the first signal prior to applying the phase correction.

26. The device of claim 25, wherein the second zero tone location is specific to the device, and wherein the first zero tone location is common among a plurality of devices.

27. A non-transitory computer-readable storage medium comprising instructions that when executed by a device, cause the device to perform:
    applying, at the device, a phase correction to a first signal to compensate for a difference between a first zero tone location comprising a first frequency and a second zero tone location comprising a second frequency, wherein applying the phase correction to the first signal comprises applying a time series of phase offset values to the first signal, wherein the time series of phase offset values are based on the first zero tone location and the second zero tone location; and
    one of:
        transmitting the first signal after applying the phase correction; or
        receiving the first signal prior to applying the phase correction.

28. The non-transitory computer-readable storage medium of claim 27, wherein the second zero tone location is specific to the device, and wherein the first zero tone location is common among a plurality of devices.

* * * * *